(12) United States Patent
Li et al.

(10) Patent No.: US 11,698,655 B1
(45) Date of Patent: Jul. 11, 2023

(54) FORCE FEEDBACK DEVICE AND HANDLE USING SAME

(71) Applicant: AAC Acousitc Technologies (Shanghai)Co., Ltd., Shanghai (CN)

(72) Inventors: Yuntong Li, Shenzhen (CN); Lijin Zhang, Shenzhen (CN); Liang Jiang, Shenzhen (CN); Bing Xie, Shenzhen (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/833,914

(22) Filed: Jun. 7, 2022

(30) Foreign Application Priority Data

Feb. 24, 2022 (CN) .......................... 202220383522.4

(51) Int. Cl.
*G05G 5/03* (2008.04)
*G05G 5/05* (2006.01)
*G05G 1/04* (2006.01)

(52) U.S. Cl.
CPC ................ *G05G 5/03* (2013.01); *G05G 1/04* (2013.01); *G05G 5/05* (2013.01)

(58) Field of Classification Search
None
See application file for complete search history.

(56) References Cited

U.S. PATENT DOCUMENTS

| | | | | |
|---|---|---|---|---|
| 4,795,296 A | * | 1/1989 | Jau | ............................ G05G 1/02 414/6 |
| 8,262,479 B2 | * | 9/2012 | Bandera | ................. G05G 9/047 463/37 |

FOREIGN PATENT DOCUMENTS

| | | | | |
|---|---|---|---|---|
| CN | 108313036 A | * | 7/2018 | ................. B60T 7/06 |
| CN | 113223883 A | * | 8/2021 | |
| EP | 2108863 A1 | * | 10/2009 | ............. F16H 59/20 |

* cited by examiner

*Primary Examiner* — Vicky A Johnson
(74) *Attorney, Agent, or Firm* — W&G Law Group

(57) ABSTRACT

The present disclosure discloses a force feedback device including a supporting bracket, a trigger hinged to the supporting bracket through a rotating shaft, a transmission shaft connected to the trigger, a driving assembly for providing an acting force to the trigger through the transmission shaft, and a reset member. A direction of the acting force is opposite to a direction of pulling the trigger. The driving assembly includes a magnetic circuit system and a coil fixed to the transmission shaft and generating an electromagnetic induction force with the magnetic circuit system. The electromagnetic induction force is transmitted to the trigger through the transmission shaft for forming the acting force. A handle using the force feedback device is also disclosed. The force feedback device and the handle disclosed by the present disclosure enable users to obtain richer game experiences according to different game scenarios.

4 Claims, 2 Drawing Sheets

FORCE FEEDBACK DEVICE AND HANDLE USING SAME

FIELD OF THE PRESENT DISCLOSURE

The present disclosure relates to electronic devices, in particular to a force feedback device and a handle using the force feedback device.

DESCRIPTION OF RELATED ART

With developments of network technologies and electronic information technologies, a great many of games are developed and becoming more and more popular. Meanwhile, users require a handle, as an operating device for the games, to meet a variety of sensory requirements.

At present, a force value curve of a trigger of a related handle on market is certain and cannot be adjusted according to different game scenarios. It is difficult to provide immersive game experiences to users.

Thus, it is necessary to provide a novel force feedback device and a handle using the force feedback device to solve the problem.

SUMMARY

An objective of the present disclosure is to provide a force feedback device and a handle using the force feedback device for enabling users to obtain richer game experiences according to different game scenarios.

In order to achieve the objective mentioned above, the present disclosure discloses a force feedback device including a supporting bracket, a trigger hinged to the supporting bracket through a rotating shaft, a transmission shaft connected to the trigger, a driving assembly for providing an acting force to the trigger through the transmission shaft, and a reset member. A direction of the acting force is opposite to a direction of pulling the trigger. The driving assembly includes a magnetic circuit system and a coil fixed to the transmission shaft and generating an electromagnetic induction force with the magnetic circuit system. The electromagnetic induction force is transmitted to the trigger through the transmission shaft for forming the acting force. Different forms of currents are fed to the coil, thereby different forms of acting forces are provided to the trigger through the transmission shaft. When pulling the trigger, users can feel different strengths and changes in different strengths of different forms of acting forces, and the acting force instantly releases as soon as removing the current, thus enabling users to obtain richer game experiences according to different game scenarios.

Further, the trigger is provided with an elongated slot, an end of the transmission shaft connected to the trigger is accommodated in the elongated slot and is able to slide in the elongated slot.

Further, the reset member is a torsion spring, the torsion spring is sleeved on the rotating shaft, one end of the torsion spring is fixed to the supporting bracket, and another end of the torsion spring is fixed to the trigger.

Further, the reset member is a spiral spring, the spiral spring connects the transmission shaft and the magnetic circuit system.

Further, the magnetic circuit system is provided with a guide rod, the transmission shaft is provided with a guide rail matched with the guide rod.

Further, a handle using the above force feedback device is also disclosed.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure.

DETAILED DESCRIPTION OF THE EMBODIMENTS

The present disclosure will hereinafter be described in detail with reference to the embodiments. To make the technical problems to be solved, and technical solutions and beneficial effects of the present disclosure more apparent, the present disclosure is described in further detail together with the figures and the embodiments. It should be understood the embodiments described hereby are only to explain the disclosure, not intended to limit the disclosure.

Figure 1:
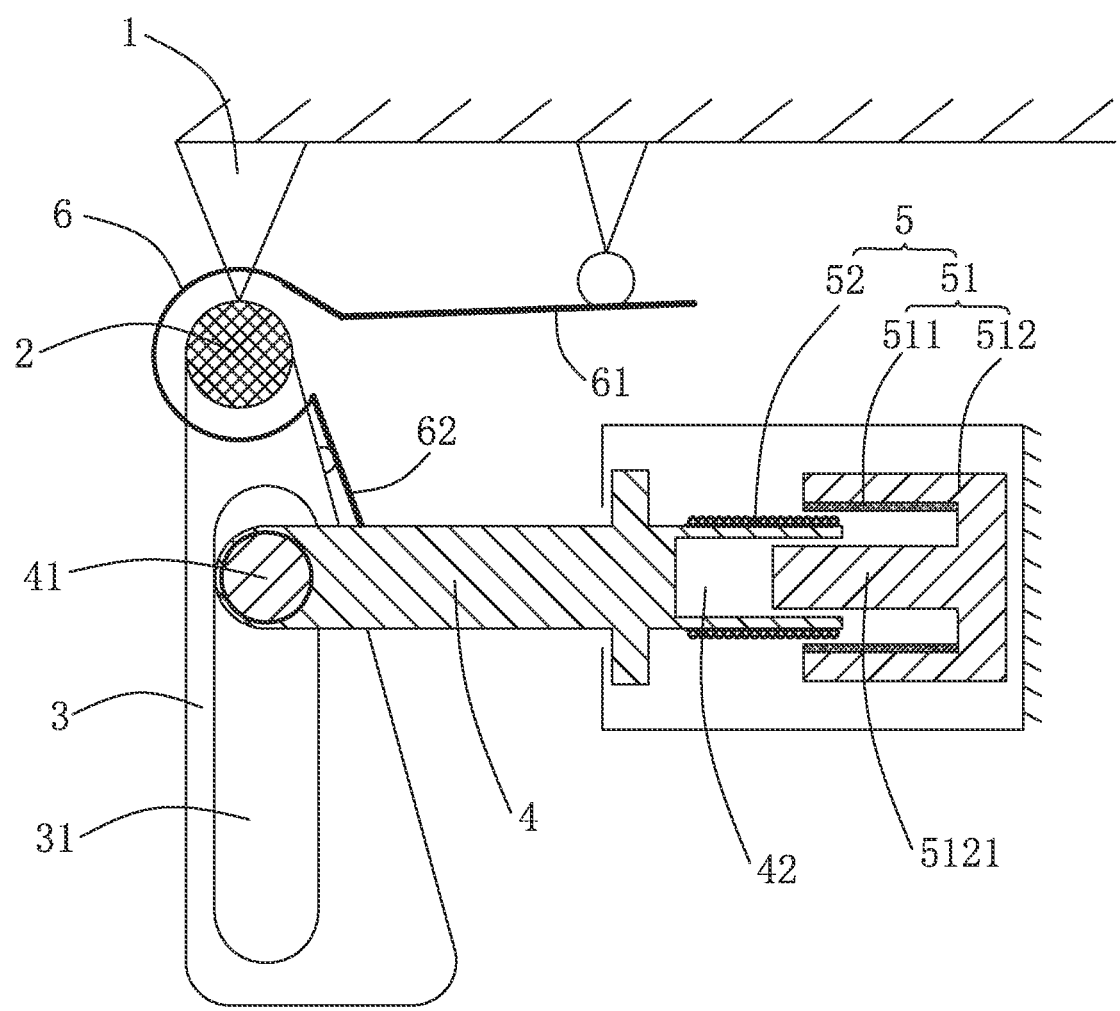
FIG. 1 is a schematic diagram of a structure of a force feedback device in accordance with an exemplary embodiment of the present disclosure.

Referring to FIG. 1, the present disclosure discloses a force feedback device 100 including a supporting bracket 1, a trigger 3 hinged to the supporting bracket 1 through a rotating shaft 2, a transmission shaft 4 connected to the trigger 3, a driving assembly 5 for providing an acting force to the trigger 3 through the transmission shaft 4, and a reset member 6. A direction of the acting force is opposite to a direction of pulling the trigger 3.

The driving assembly 5 includes a magnetic circuit system 51 and a coil 52. The magnetic circuit system 51 includes a magnet 511 and a yoke 512 holding the magnet 511. The coil 52 is fixed to the transmission shaft 4 and generates an electromagnetic induction force with the magnetic circuit system 51. The electromagnetic induction force is transmitted to the trigger 3 through the transmission shaft 4 for forming the acting force.

The trigger 3 is provided with an elongated slot 31, an end 41 of the transmission shaft 4 connected to the trigger 3 is accommodated in the elongated slot 31 and is able to slide in the elongated slot 31. When the trigger 3 rotates around the rotating shaft 2, the end 41 of the transmission shaft 4 connected to the trigger 3 slides in the elongated slot 31.

The yoke 512 is provided with a guide rod 5121, the transmission shaft 4 is provided with a guide rail 42 matched with the guide rod 5121.

The reset member 6 is a torsion spring, the torsion spring is sleeved on the rotating shaft 2, one end 61 of the torsion spring is fixed to the supporting bracket 1, and another end 62 of the torsion spring is fixed to the trigger 3.

Figure 2:
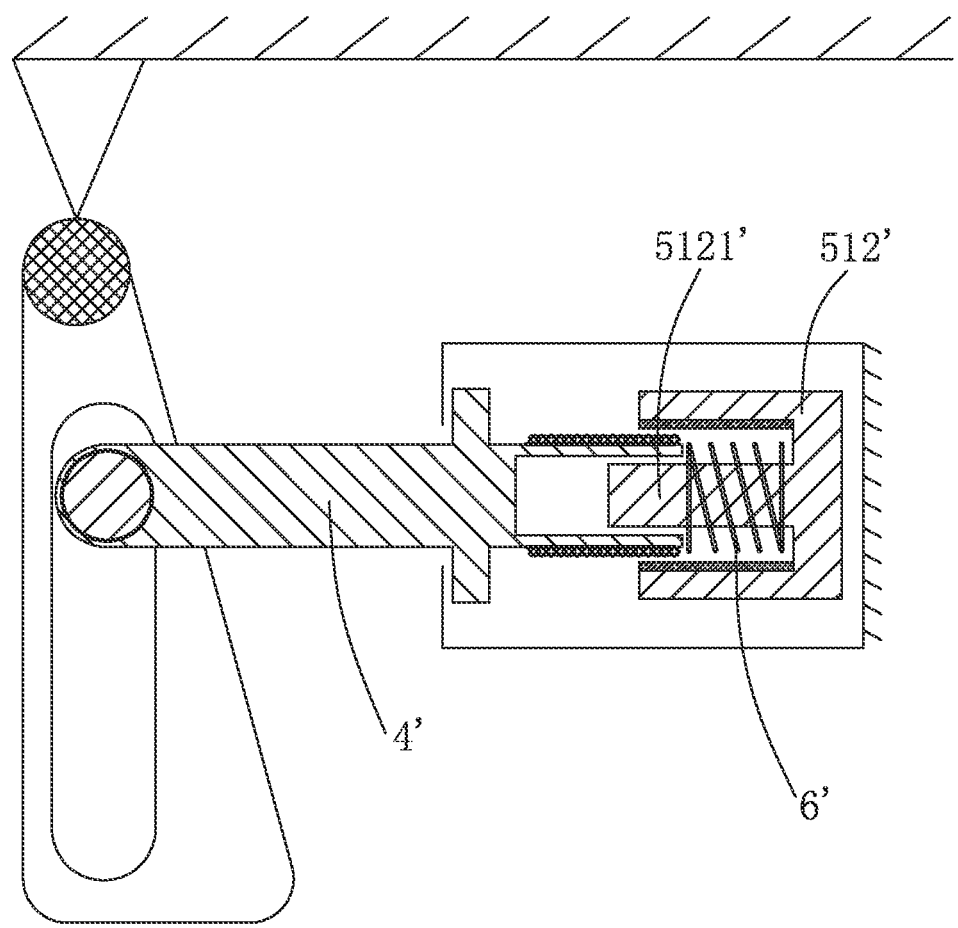
FIG. 2 is a schematic diagram of a structure of another force feedback device.

Referring to FIG. 2, another force feedback device 200 is disclosed. A difference between the force feedback device 200 and the aforementioned force feedback device 100 lies in different reset members, and the rest can refer to the aforementioned force feedback device 100. A reset member 6' of the force feedback device 200 is a spiral spring, the spiral spring connects a transmission shaft 4' and a yoke 512'. Optionally, the spiral spring is sleeved on a guide rod 5121' of the yoke 512'.

Further, a handle using the above force feedback device 100/200 is also disclosed.

Different forms of currents are fed to the coil, thereby different forms of acting forces are provided to the trigger through the transmission shaft. When pulling the trigger, users can feel different strengths and changes in different strengths of different forms of acting forces, and the acting force instantly releases as soon as removing the current, thus enabling users to obtain richer game experiences according to different game scenarios.

For understanding effects described in the present disclosure better, examples are given for introducing different forms of currents are fed to the coil. It should be noted that these examples do not limit the present disclosure, and the present disclosure includes but is not limited to these possible examples.

When a continuous direct current is fed to the coil, the coil generates an electromagnetic induction force in a magnetic field of the magnetic circuit system. The electromagnetic induction force is transmitted to the trigger through the transmission shaft for forming an acting force. A direction of the acting force is opposite to a direction of pulling the trigger. Users can feel the acting force when pulling the trigger. When values of the continuous direct current are changed, acting forces felt by users accordingly change, thus users can feel different strengths for pulling the trigger.

When a pulsed direct current is fed to the coil, in a feeding-on section, users can feel an acting force, then in a feeding-off section, the acting force releases, then in a next feeding-on section, users can feel a next acting force that may be same to or different from the previous acting force, thus users can feel changes in different strengths for pulling the trigger and obtain experiences similar to "cadences" and "knocks" when pulling the trigger.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A force feedback device, comprising:
   a supporting bracket;
   a trigger hinged to the supporting bracket through a rotating shaft;
   a transmission shaft connected to the trigger, provided with a guide rail;
   a driving assembly for providing an acting force to the trigger through the transmission shaft, a direction of the acting force being opposite to a direction of pulling the trigger, the driving assembly comprising:
      a magnetic circuit system, provided with a guide rod matched with the guide rail;
      a coil fixed to the transmission shaft and generating an electromagnetic induction force with the magnetic circuit system, the electromagnetic induction force being transmitted to the trigger through the transmission shaft for forming the acting force; and
   a reset member.

2. The force feedback device as described in claim 1, wherein the trigger is provided with an elongated slot, an end of the transmission shaft connected to the trigger is accommodated in the elongated slot and is able to slide in the elongated slot.

3. The force feedback device as described in claim 1, wherein the reset member is a torsion spring, the torsion spring is sleeved on the rotating shaft, one end of the torsion spring is fixed to the supporting bracket, and another end of the torsion spring is fixed to the trigger.

4. The force feedback device as described in claim 1, wherein the reset member is a spiral spring, the spiral spring connects the transmission shaft and the magnetic circuit system.

\* \* \* \* \*